Sept. 3, 1968  G. C. CHAPMAN  3,399,983
APPARATUS FOR CONTROLLING GLASS TUBE AND ROD DIMENSIONS
Filed March 22, 1965
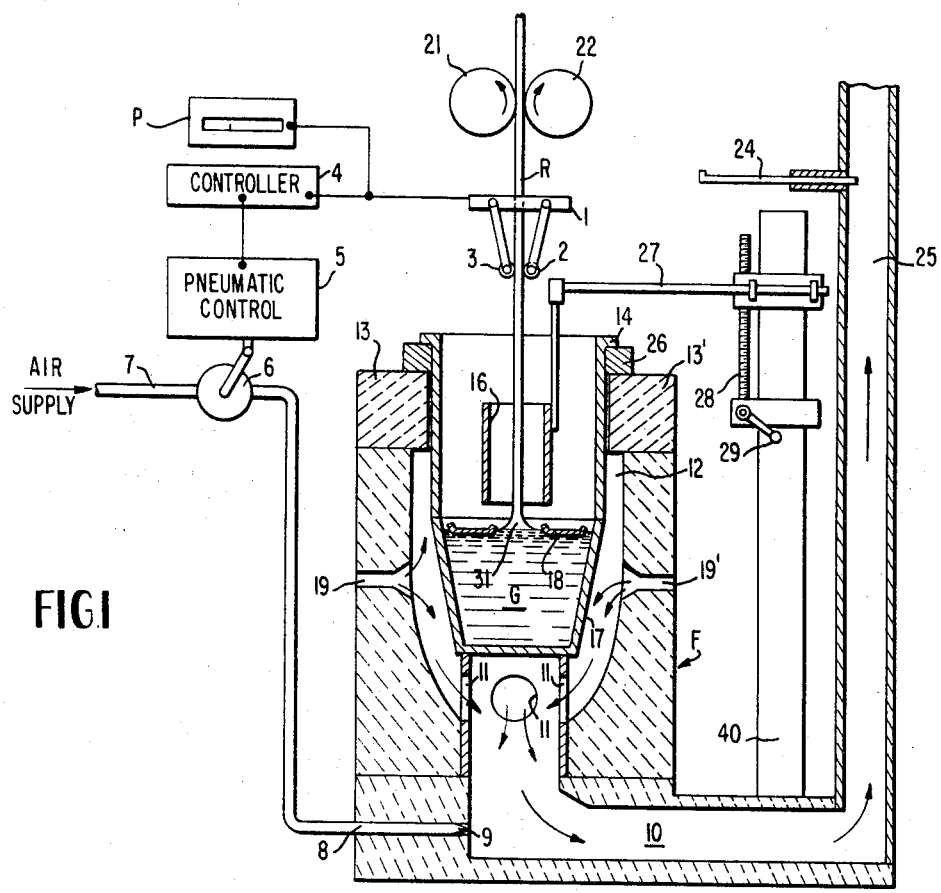
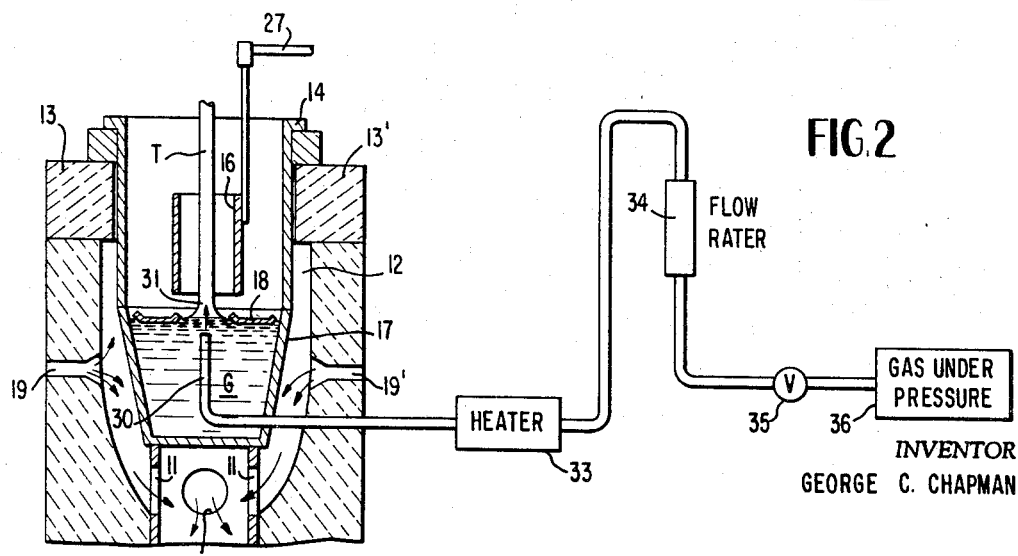
INVENTOR
GEORGE C. CHAPMAN

United States Patent Office 3,399,983
Patented Sept. 3, 1968

3,399,983
APPARATUS FOR CONTROLLING GLASS
TUBE AND ROD DIMENSIONS
George C. Chapman, Toledo, Ohio, assignor to Owens-Illinois, Inc., a corporation of Ohio
Continuation-in-part of application Ser. No. 63,589, Oct. 19, 1960. This application Mar. 22, 1965, Ser. No. 441,821
3 Claims. (Cl. 65—188)

ABSTRACT OF THE DISCLOSURE

Apparatus for controlling the external dimension of glass tubing or rod which is being drawn upwardly from a container of molten glass, which is surrounded by a heated gaseous atmosphere. A part of said atmosphere is exhausted through an exhaust duct by means of an eduction system in which air under pressure is introduced into the exhaust duct of relatively high velocities so as to produce increased flow of hot gases from around the container, in response to measurements of the diameter of the glass tubing or rod being formed.

---

This is a continuation-in-part of application Ser. No 63,589 filed Oct. 19, 1960, now abandoned.

The present invention relates to an improvement in the production of glass rods and tubes from a molten supply as is well known in the art wherein the rods or tubes are drawn upward from the supply so as to maintain a desired uniform diameter in the rods or tubes as the case may be. More specifically the present invention relates to an improved method and apparatus for producing glass rods and tubes of uniform cross-sectional area.

According to the present invention, elongated circular cylindrical glass members, representative of which are glass rods and tubes, of uniform diameter are obtained by the employment of an eductor with a glass melting furnace such that there is produced a continuous regulated inflow of cooling air about the furnace and consequent outflow of hot gases whereby a constancy in the diameter of the glass is maintained. The amount of air which will flow through the eductor will be determined by a valve which is in turn controlled by a gauge means which measures the outside diameter of the glass rod or tube as formed.

The invention will be understood more readily by reference to the accompanying drawing in which:

FIG. 1 sets forth a schematic cross-sectional view of the apparatus embodying the invention for drawing glass rods; and FIG. 2 shows a modification of the container of FIG. 1 for drawing glass tubes.

The apparatus shown illustrates the updrawing of a glass rod R wherein an outside diameter gauge 1 having rollers 2 and 3 feeds an electrical signal to controller 4. If desired, a recorder P can be inserted in the circuit between gauge 1 and controller 4 to give a continuous visual representation of fluctuations in diameter size of the tube or rod being drawn. In the event the diameter of the glass rod becomes too great, controller 4 will actuate pneumatic control 5 whereby air valve 6 mounted on conduit 7 will throttle off the air suply being supplied by eductor 8 through nozzle 9 into tunnel 10. The latter is connected by openings 11 to furnace cavity 12. The flow of hot gases in cavity 12 is prevented from coming in contact with the surface of the molten glass G and rod R. In addition the fluidity and character of the molten glass 6 in container 17, preferably platinum, will be controlled by water-cooled jacket 16 and lenser 18 which is a non-corroding annular cover floating on the surface of glass 6.

In operation a suitable soda-lime glass mixture G was fused in container 17 by means of a plurality of circumferentially positioned gas burners 19 and 19'. When the fused glass has reached the proper fluidity and temperature as determined for example by an optical pyrometer, a suitable bait (not shown) is introduced into the molten glass and a glass rod is manually drawn upward between gauge rollers 2 and 3 and on to take up or tractor rollers 21 and 22 as is well known in the art. Once the desired outside diameter has been determined, gauge 1 operating through controller 4 will actuate control 5 whereby a regulated amount of air under pressure from a source of supply (not shown) will pass through valve 6 into eductor 8 through nozzle 9 into tunnel passage 10. This flow of air will cause a controlled flow of hot gases to circulate through cavity 12 about container 17 and ultimately openings 11 to be swept into tunnel 10 and up stack 25 to the outside air. A damper 24 can be employed with chimney or stack 25, if desired.

Where glass tubing is to be made with the novel apparatus of the present invention, the apparatus of FIG. 2 is employed in which FIG. 1 is modified by having a pipe 30 supply a gas such as air or nitrogen immediately below the root 31 so as to form a bore to the tubing T. The manner in which this inflation system consisting of a gas source 36 under pressure, valve 35, flow rater 34, and heater 33 are related to inflow pipe 30 will be evident from FIG. 2. Such an inflation system is well known in the art as indicated by U.S. Patent No. 2,085,245.

Various modifications can be made in the apparatus employed in the present invention. For example, cylindrical water-cooled jacket 16 employed to cool the updrawn glass rod or tube can be positioned at different levels by bracket 27 which is adjustable by screw 28 and crank 29 mounted on supporting column 40.

Baffle 14 has a particularly salutary effect in the apparatus of the present invention since it permits the burners 19 and 19' to run at a higher intensity thereby holding the glass in the container at a higher temperature without the flames from the burners reheating the rod (or tube) so as to thin the same as it is being drawn out of the container.

By way of further illustration the present invention will be more completely understood by the following example in which glass tubing was formed using the method and apparatus of the present invention.

EXAMPLE

A glass batch of the following composition:

| Component | Weight, pounds |
|---|---|
| Sand | 6.28 |
| Soda ash | 1.01 |
| Niter | .37 |
| Calcined alumina | .46 |
| Boric acid | 3.93 |
| Cerium hydrate | .05 |
| Antimony | .04 | was heated to a temperature of 2860° F. in platinum crucible of FIG. 2. The fused glass was then permitted to cool to 1900° F. at which time drawing of the glass tubing initiated by means of a bait was begun. A chronology of the drawing process and how the eductor was used control glass dimensions are set forth below:

| Time | Furnace, Temp. | Eductor, p.s.i. | Draw rate | Tube dimension [1] | | | |
|---|---|---|---|---|---|---|---|
| | | | | OD | | Wall | |
| | | | | Max. | Min. | Max. | Min. |
| 1:36 | 2,110 | 20 | 6'/min | | | | |
| 1:37 | 2,110 | 20 | 6'/min | .520 | .450 | .040 | .038 |
| 1:39 | | [2] 10 | 6'/min | | | | |
| 1:48 | 2,220 | 10 | 6'/min | .460 | .425 | .035 | .035 |
| 1:49 | | [3] 15 | 6'/min | | | | |
| 1:53 | 2,230 | 15 | 6'/min | .475 | .435 | .033 | .033 |
| 1:59 | 2,230 | 15 | 6'/min | .495 | .460 | .035 | .035 |
| 2:02 | | 15 | 4'/min.[4] | | | | |
| 2:05 | 2,190 | 15 | 4'/min | .500 | .475 | .041 | .035 |
| 2:09 | 2,160 | 15 | 4'/min | .475 | .440 | .040 | .040 |
| 2:11 | | [5] 20 | 4'/min | | | | |
| 2:17 | 2,120 | 20 | 4'/min | .465 | .450 | .045 | .043 |
| 2:23 | 2,100 | 20 | 4'/min | .550 | .504 | .049 | .034 |
| 2:29 | 2,080 | 20 | 4'/min | .583 | .538 | .049 | .035 |
| 2:33 | | 15 | 4'/min | | | | |
| 2:36 | 2,060 | [6] 15 | 4'/min | .537 | .499 | .064 | .048 |
| 2:38 | 2,050 | [7] 10 | ([8]) | .535 | .495 | .065 | .050 |

[1] Desired tube dimensions were .440″–.560″ for OD and .040″–.060″ for Wall.
[2] Eductor pressure reduced since tube dimensions tended to show increase above desired tube dimensions.
[3] Eductor pressure increased since tube dimensions showed a trend to decrease below desired tube dimensions.
[4] Burner intensity was reduced and drawing rate was decreased to stabilize drawing conditions.
[5] See note 3 above.
[6] and [7]. See note 2 above.
[8] Drawing was terminated.

In the present example actually a total of 40 lbs. of the above glass composition was fused in crucible and a total of 16 lbs. of glass were drawn. The range in OD was from .425″ to .583″ and in the wall was .033″ to .065″. The average OD was .504″ and the average wall was .049″. From the above example of a typical drawing run, it will be noted that when the eductor pressure is increased, rod (or tube) dimensions increase and when the eductor pressure is decreased, the rod (or tube) dimensions decrease.

Gauge 1, controller 4, and pneumatic control 5 are glass forming controls well known in the art and various types are available. A gauge 1, which was found suitable in the present process, was one identified by a linear motion and made by Bourns Laboratory Inc. Similarly a controller 4 employed which proved satisfactory was one identified as a Brown "electronik" rectangular chart air operated air-o-line controller with integral by-pass, variable proportional band, reset action and rate action manufactured by the Minneapolis-Honeywell Regulator Co.

While the methods and articles described herein constitute preferred embodiments of the invention, it is to be understood that the invention is not limited to these precise methods and articles and that changes can be made therein without departing from the scope of the invention which is founded in the appended claims.

I claim:
1. In an apparatus for updrawing a continuous cylindrical glass member comprising a container for molten glass, means for drawing said glass member upwardly from the container, means for continuously measuring the diameter of the glass member, a furnace having a cavity which is closed at its top and which envelops said container, means associated with said furnace for heating said container to render the glass therein molten, a tunnel passage located beneath said furnace and connected to said cavity, and means for the introduction of gas under pressure controlled by said diameter measuring means and connected to said cavity and tunnel to regulate the flow of hot gases through the furnace cavity and tunnel to thereby control the temperature of the container and therefore the viscosity of the molten glass therein.

2. The apparatus of claim 1 in which the tunnel passage is also connected to a stack.

3. The apparatus of claim 1 in which there are means for effecting cooling of the updrawn glass.

References Cited
UNITED STATES PATENTS

| | | | |
|---|---|---|---|
| 702,014 | 6/1902 | Lubbers | 65—85 |
| 967,966 | 8/1910 | Pease | 65—84 |
| 1,894,201 | 1/1933 | Salomon | 65—88 |
| 2,085,245 | 6/1937 | Woods | 65—86 |
| 2,158,669 | 5/1939 | Amsler | 65—84 |
| 2,958,160 | 11/1960 | Cooke et al. | 65—161 |

DONALL H. SYLVESTER, *Primary Examiner.*

E. R. FREEDMAN, *Assistant Examiner.*